United States Patent
Liu et al.

(10) Patent No.: US 12,423,564 B2
(45) Date of Patent: Sep. 23, 2025

(54) NEURON CIRCUIT AND NEURAL NETWORK CIRCUIT

(71) Applicant: Institute of Microelectronics, Chinese Academy of Sciences, Beijing (CN)

(72) Inventors: Qi Liu, Beijing (CN); Xumeng Zhang, Beijing (CN); Ming Liu, Beijing (CN); Hangbing Lv, Beijing (CN); Shibing Long, Beijing (CN)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 1270 days.

(21) Appl. No.: 17/250,569

(22) PCT Filed: Aug. 7, 2018

(86) PCT No.: PCT/CN2018/099211
§ 371 (c)(1),
(2) Date: Feb. 3, 2021

(87) PCT Pub. No.: WO2020/029079
PCT Pub. Date: Feb. 13, 2020

(65) Prior Publication Data
US 2021/0295143 A1    Sep. 23, 2021

(51) Int. Cl.
*G06N 3/063* (2023.01)
*G06N 3/08* (2023.01)

(52) U.S. Cl.
CPC ............... *G06N 3/063* (2013.01); *G06N 3/08* (2013.01)

(58) Field of Classification Search
CPC .................. G06N 3/063; G06N 3/08
See application file for complete search history.

(56) References Cited

U.S. PATENT DOCUMENTS 9,543,359 B2 * 1/2017 Lu .......................... H10B 63/80
10,056,907 B1 * 8/2018 Asnaashari ........ H03K 19/1776
(Continued)

FOREIGN PATENT DOCUMENTS

CN    103810497 A    5/2014
CN    106779059 A    5/2017
(Continued)

OTHER PUBLICATIONS

Zhang et al., "Hybrid memristor-CMOS neurons for in-situ learning in fully hardware memristive spiking neural networks", Dec. 11, 2020, Elsevier B.V. and Science China Press (Year: 2020).*

(Continued)

*Primary Examiner* — Kakali Chaki
*Assistant Examiner* — Michael H Hoang
(74) *Attorney, Agent, or Firm* — Schwegman Lundberg & Woessner, P.A.

(57) ABSTRACT

A neuron circuit (100), including a memristive element (M1) used to receive an excitation signal; a trigger element (D1) connected to the memristive element (M1) and used to receive a clock control signal for the neuron circuit and an output signal of the memristive element (M1); a feedback element (T1) connected to an output end of the trigger element (D1) and an input end of the memristive element (M1), and used to control a voltage at the input end of the memristive element (M1); and an AND circuit (A1) used to perform an AND operation on an output signal of the trigger element (D1) and the clock control signal. An output signal of the AND circuit (A1) acts as an output signal of the neuron circuit (100).

20 Claims, 5 Drawing Sheets

(56) References Cited

U.S. PATENT DOCUMENTS

| | | | | |
|---|---|---|---|---|
| 2007/0285040 | A1* | 12/2007 | Jenner | B25J 9/161 |
| | | | | 318/568.1 |
| 2012/0011088 | A1* | 1/2012 | Aparin | G06N 3/02 |
| | | | | 706/33 |
| 2012/0011092 | A1* | 1/2012 | Tang | G11C 11/54 |
| | | | | 706/33 |
| 2013/0026440 | A1* | 1/2013 | Yang | H10B 63/80 |
| | | | | 257/4 |
| 2013/0311413 | A1 | 11/2013 | Rose et al. | |
| 2014/0027700 | A1* | 1/2014 | Nickel | H10N 70/8833 |
| | | | | 257/3 |
| 2014/0035614 | A1* | 2/2014 | Pickett | G06N 3/065 |
| | | | | 326/30 |
| 2015/0028278 | A1 | 1/2015 | Lee et al. | |
| 2015/0178619 | A1* | 6/2015 | Nishitani | G06N 3/063 |
| | | | | 706/26 |
| 2015/0294217 | A1* | 10/2015 | Aparicio, IV | G06N 3/049 |
| | | | | 706/26 |
| 2017/0324379 | A1* | 11/2017 | Kumar | H03B 7/06 |
| 2018/0075337 | A1* | 3/2018 | Buchanan | G11C 13/0007 |
| 2020/0110985 | A1* | 4/2020 | Kataeva | G06V 10/82 |

FOREIGN PATENT DOCUMENTS

| | | |
|---|---|---|
| CN | 106815636 A | 6/2017 |
| CN | 107742156 A | 2/2018 |
| CN | 107909146 A | 4/2018 |

OTHER PUBLICATIONS

Wang, R. et al., "Recent Advances of Volatile Memristors: Devices, Mechanisms, and Applications", 2020, WILEY-VCH Verlag GmbH & Co. KGaA, Weinheim, p. 2 and 10 (Year: 2020).*

Wang, J. et al., "Hybrid oxide brain-inspired neuromorphic devices for hardware implementation of artificial intelligence", 2020, National Institute for Materials Science in partnership with Taylor & Francis Group (Year: 2020).*

Yang, Q. et al., "Neural changes in Alzheimer's disease from circuit to molecule: Perspective of optogenetics", Dec. 20, 2016, Elsevier (Year: 2016).*

Yesil, Abdullah, Fatih Gül, and Yunus Babacan. "Emulator Circuits and Resistive Switching Parameters of Memristor." (2018). https://pdfs.semanticscholar.org/8c2e/c2df347f4f8a2312d7572f8e871eae5206e0.pdf (Year: 2018).*

"International Application Serial No. PCT/CN2018/099211, International Search Report mailed May 31, 2019", (May 31, 2019), 2 pgs.

"International Application Serial No. PCT/CN2018/099211, Written Opinion mailed May 31, 2019", (May 31, 2019), 3 pgs.

"Chinese Application Serial No. 201810891822.1, Office Action mailed Mar. 17, 2020", w/ English Translation, (Mar. 17, 2020), 20 pgs.

* cited by examiner

NEURON CIRCUIT AND NEURAL NETWORK CIRCUIT

PRIORITY APPLICATIONS

This application is a U.S. National Stage Filing under 35 U.S.C. § 371 from International Application No. PCT/CN2018/099211, filed on Aug. 7, 2018, and published as WO2020/029079 on Feb. 13, 2020; the benefit of priority of which is hereby claimed herein, and which application and publication are hereby incorporated herein by reference in their entirety.

TECHNICAL FIELD

The present disclosure relates to the field of artificial intelligence, and in particular to a neuron circuit and a neural network circuit.

BACKGROUND

Traditional neuron circuit is based on CMOS devices, and only consists of capacitors and dozens of transistors, which cannot be integrated on a large scale. Furthermore, the neuron circuit based on CMOS devices can only achieve self-learning through external control circuits and software programming, that is, it has no inherent self-learning ability and the power consumption is high.

In the related art, although the neuron circuits may be constructed based on memristors, most neuron circuits use capacitors or passive components to achieve the process of integrated emission and do not have cascading effects and driving capabilities. Therefore, there is still a lack of neuron circuits that can match synaptic devices in a large-scale integrated neural network.

SUMMARY

The present disclosure intends to provide a neuron circuit that can be integrated in high density.

An embodiment of the present disclosure provides a neuron circuit, including: a memristive element configured to receive an excitation signal; a trigger element connected to the memristive element and configured to receive a clock control signal for the neuron circuit and an output signal of the memristive element; a feedback element connected to an output end of the trigger element and an input end of the memristive element, and configured to control a voltage at the input end of the memristive element; and an AND circuit configured to perform an AND operation on an output signal of the trigger element and the clock control signal; wherein an output signal of the AND circuit acts as an output signal of the neuron circuit.

Further, an initial state of the memristive element is a high-resistance non-conducting state, and the memristive element enters a low-resistance conducting state when a voltage at the input end of the memristive element is greater than a first threshold voltage of the memristive element.

Further, the memristive element accumulates a voltage of the excitation signal at the input end of the memristive element, so that the voltage at the input end of the memristive element is greater than the first threshold voltage of the memristive element.

Further, the memristive element spontaneously returns to the high-resistance non-conducting state when the voltage at the input end of the memristive element is less than a second threshold voltage of the memristive element, wherein the first threshold voltage is greater than the second threshold voltage.

Further, when the output end of the trigger element outputs a signal, the feedback element is turned on, and the voltage at the input end of the memristive element is reduced, so that the memristive element spontaneously returns to the high-resistance non-conducting state.

Further, the memristive element is a volatile threshold-conversion memristive element.

Further, the volatile threshold-conversion memristive element includes: a substrate; a first electrode layer located on the substrate; a functional layer located on the first electrode layer; and a second electrode layer located on the functional layer; wherein the functional layer is configured to isolate the first electrode layer from the second electrode layer so that the initial state of the memristive element is the high-resistance non-conducting state, and to provide a growth medium for the memristive element to change from the high-resistance non-conducting state to the low-resistance conducting state.

Further, the substrate is made of silicon wafer, quartz or organic flexible film; the first electrode layer is made of inert conductive metal material; the functional layer is made of insulator or semiconductor material; and the second electrode layer is made of conductive metal material.

Further, the first electrode layer is made of at least one of Pd, Au, Ru, Pt, TiN, TaN, ITO, W, or Ta; the functional layer is made of at least one of $SiO_2$, $HfO_2$, $SiN_x$, $TaO_x$, $MgO_x$, a-Si, $NbO_x$, $VO_x$, or $AM_4Q_8$, wherein A is Ga or Ge, M is V, Nb, Ta or Mo, and Q is S or Se; and the second electrode layer is made of at least one of Ag, Cu, Pd, Au, Ru, Pt, TiN, TaN, ITO, W, or Ta.

Further, the neuron circuit further includes a synaptic element configured to adjust an intensity of the excitation signal.

Further, the neuron circuit further includes: a first bias element having one end connected to the input end of the memristive element and the other end grounded; and a second bias element having one end connected to the output end of the memristive element and the other end grounded.

Further, the synaptic element is a non-volatile memristive device.

According to another aspect of the present disclosure, an embodiment of the present disclosure further provides a neural network circuit, including: a plurality of neuron circuits described above; and a plurality of synaptic elements configured to connect adjacent two of the neuron circuits.

Further, an intensity of the input signal of the neuron circuit is adjusted by a conductance value of the synaptic element.

Compared with the prior art, the present disclosure has at least the following advantages.

1. A new type of volatile threshold-conversion memristive device is used as an integral component of the neuron, which may have characteristics of integrated emission of biological neurons and is beneficial to production of a brain-like nerve chip.

2. A clock control of the output signal is achieved through a digital trigger, and a driving ability of the neuron is improved through the AND output.

3. The neuron circuit provided by the present disclosure has a simple structure, and its related devices may be prepared under the most advanced CMOS nodes, which is beneficial to high-density integration of circuits. Moreover, compared with the traditional CMOS circuit, reset operation is reduced by using volatility characteristics of the threshold-conversion device, and the energy consumption is greatly reduced.

BRIEF DESCRIPTION OF THE DRAWINGS

With the following description of the present disclosure with reference to the drawings, other objectives and advantages of the present disclosure would be obvious and the present disclosure would be understood comprehensively.

DETAILED DESCRIPTION

In order to make the objectives, technical solutions and advantages of the present disclosure more clear, the technical solutions of the present disclosure are clearly and completely described below with reference to the drawings of the embodiments of the present disclosure. Obviously, the described embodiments are only a part but not all of the embodiments of the present disclosure. Based on the embodiments of the present disclosure, all other embodiments obtained by those ordinary skilled in the art without carrying out creative work fall within the protection scope of the present disclosure.

Unless otherwise defined, technical terms or scientific terms used in the present disclosure shall be of the general meaning understood by the ordinary skilled in the art.

Figure 1:
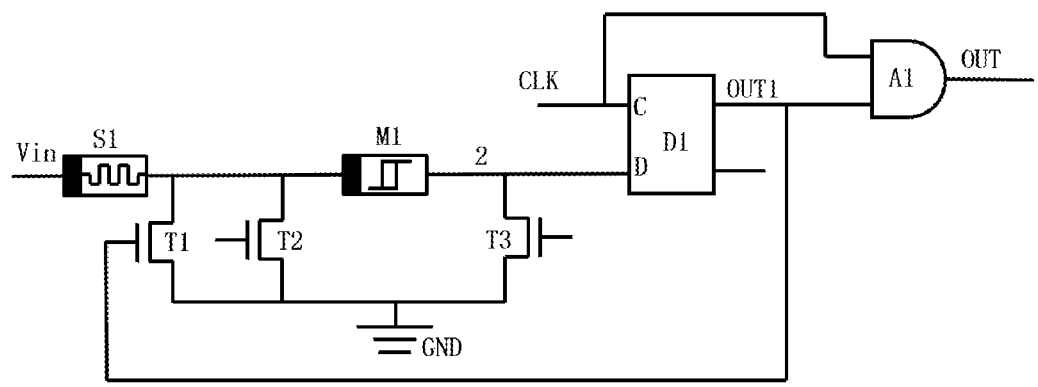
FIG. 1 is a schematic structural diagram of a neuron circuit provided by an embodiment of the present disclosure.

As shown in FIG. 1, an embodiment of the present disclosure provides a neuron circuit 100, including a memristive element M1, a trigger element D1, a feedback element T1, and an AND circuit A1.

The memristive element M1 shown in FIG. 1 is used to receive an excitation signal. It may be a volatile threshold-conversion memristive element M1, which may have an integral accumulation effect and volatility. An initial state of the memristive element M1 may be a high-resistance non-conducting state. When an intensity of input excitation signals accumulated by the memristive element M1 reaches a certain level, the memristive element M1 may enter a low-resistance conducting state. If there is no signal input at an input end of the memristive element M1 or the intensity of signal is very small, the memristive element M1 spontaneously returns to the initial high-resistance non-conducting state from the low-resistance conducting state.

In this embodiment, the memristive element M1 changes the conducting state by forming a complete conductive path. During the formation of the conductive path, the memristive element M1 is always in the high-resistance non-conducting state. Once the conductive path is formed, the memristive element M1 is turned on, and then changes from the initial high-resistance non-conducting state to the low-resistance conducting state. After the conductive path is formed, if the input excitation signal is insufficient to maintain a stable existence of the conductive path, the conductive path in the memristive element M1 is broken, and the memristive element M1 spontaneously returns to the high-resistance non-conducting state. It should be noted that, during the formation of the conductive path, the input excitation may cause a growth rate of the conductive path to be greater than a speed at which the memristive element M1 spontaneously returns.

Specifically, when the voltage at the input end of the memristive element M1 is greater than a first threshold voltage of the memristive element M through the accumulation effect of the memristive element M1, the memristive element M1 changes from the initial high-resistance non-conducting state to the low-resistance conducting state, and when the voltage at the input terminal of the memristive element M1 is less than a second threshold voltage of the memristive element M1, the memristive element M1 spontaneously returns to the high-resistance non-conducting state, wherein the first threshold voltage is greater than the second threshold voltage.

Figure 6:
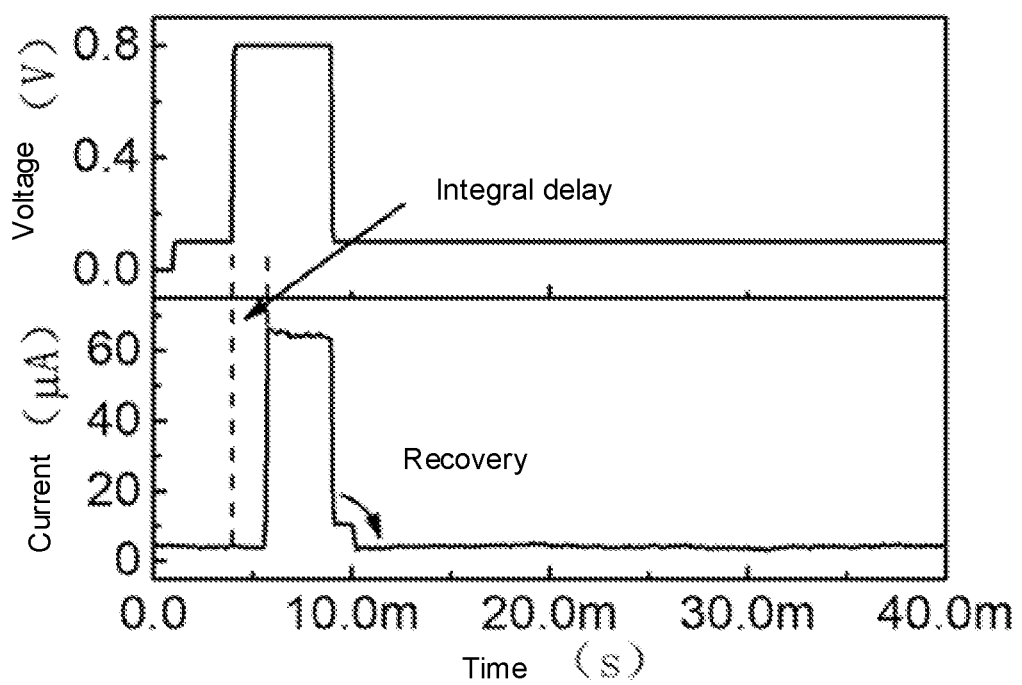
FIG. 6 is a schematic diagram of transient response characteristics of the memristive element provided by the present disclosure under a single pulse excitation.

In this embodiment, FIG. 6 shows a transient response of the volatile threshold-conversion memristive element M1 under a single pulse excitation. When a voltage pulse is applied to the memristive element M1, after a period of integral delay accumulation, the memristive element M1 enters the low-resistance conducting state. When the pulse excitation signal is removed, the memristive element M1 spontaneously returns to the high-resistance non-conducting state after a short recovery process.

Figure 2:
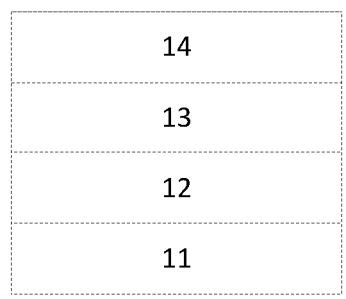
FIG. 2 is a schematic structural diagram of a memristive element provided by an embodiment of the present disclosure.

In this embodiment, as shown in FIG. 2, the memristive element M1 may include a substrate 11, a first electrode layer 12, a functional layer 13, and a second electrode layer 14. The first electrode layer 12 and the functional layer 13 are located between the substrate 11 and the second electrode layer 14, and the first electrode layer 12 is located between the substrate 11 and the functional layer 13. That is to say, the first electrode layer 12 is located on the substrate 11, the functional layer 13 is located on the first electrode layer 12, and the second electrode layer 14 is located on the functional layer 13. The functional layer 13 is used to isolate the first electrode layer 12 from the second electrode layer 14, so that the initial state of the memristive element M1 may be the high-resistance non-conducting state. The functional layer 13 may further provide a growth medium for the memristive element M1 to change from the high-resistance non-conducting state to the low-resistance conducting state.

In a further preferred embodiment, the substrate 11 may be made of a silicon wafer, a quartz or an organic flexible film. The first electrode layer 12 may be made of an inert conductive metal material. For example, the first electrode layer 12 may be made of at least one of Pd, Au, Ru, Pt, TiN, TaN, ITO, W, or Ta. The functional layer 13 is made of an insulator or semiconductor material. For example, the functional layer 13 may be made of at least one of $SiO_2$, $HfO_2$, $SiN_x$, $TaO_x$, $MgO_x$, a-Si, $NbO_x$, $VO_x$, or $AM_4Q_8$, where A may be Ga or Ge, M may be V, Nb, Ta or Mo, and Q may be S or Se. The second electrode layer 14 is made of a conductive metal material. For example, the second electrode layer 14 may be made of at least one of Ag, Cu, Pd, Au, Ru, Pt, TiN, TaN, ITO, W, or Ta.

Figure 3:
FIGS. 3-5 are schematic diagrams of a manufacturing process of a memristive element provided by an embodiment of the present disclosure.
Figure 4:
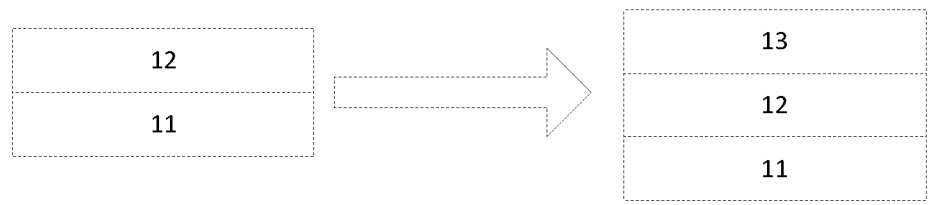
Figure 5:
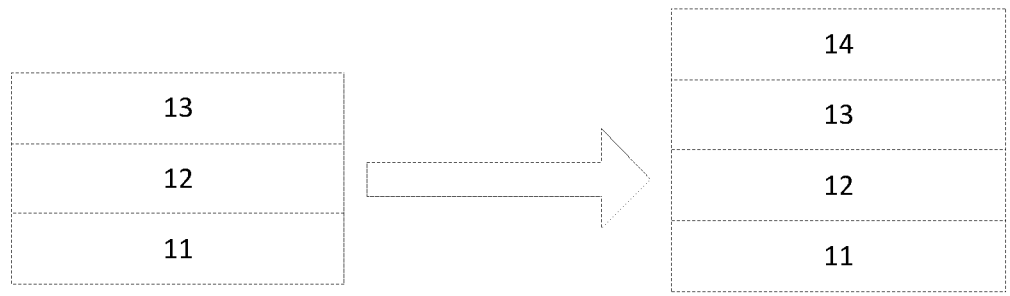

FIGS. 3-5 show the specific preparation process of the memristive element M1 provided by the embodiment of the present disclosure. First, the first electrode layer 12 may be formed on the substrate 11. Secondly, the functional layer 13 may be formed on the first electrode layer 12. Finally, the second electrode layer 14 is formed on the functional layer 13.

Specifically, a material of the first electrode layer 12 may be prepared by one of electron beam evaporation, pulsed laser deposition or sputtering, and a material of the second electrode layer 14 may be prepared by one of electron beam evaporation, chemical vapor deposition, pulsed laser deposition, atomic layer deposition or sputtering. Then the material of the first electrode layer 12 may be deposited on a silicon wafer by photolithography or stripping so as to form the first electrode layer 12. The functional layer 13 may be formed on the first electrode layer 12 by deposition. For example, the functional layer 13 may be deposited on the first electrode layer 12 by chemical vapor deposition, magnetron sputtering, electron beam evaporation, pulsed laser deposition, atomic layer deposition, or the like. The material of the second electrode layer 14 is deposited on the functional layer 13 preferably by photolithography or stripping so as to form the second electrode layer 14.

For example, a pattern of the first electrode layer 12 may be formed on the substrate 11 by photolithography, and a film of the first electrode layer 12 may be formed by deposition. Then a pattern of the functional layer 13 is formed on the first electrode layer 12 by photolithography, and a film of the functional layer 13 is formed by deposition. Finally, a pattern of the second electrode layer 14 is formed on the functional layer 13 by photolithography, and a film of the second electrode layer 14 is formed by deposition. In this way, the volatile threshold-conversion memristive element M1 is prepared.

The trigger element D1 shown in FIG. 1 is connected to the memristive element M1 and is used to receive a clock control signal CLK of the circuit and the output signal of the memristive element M1. The clock control signal CLK is a global clock signal.

In this embodiment, the trigger element D1 may serve as a clock control unit of the output of the neuron circuit 100, so as to achieve a clock control of the output signal. The clock control signal CLK at the input end of the trigger element D1 has the same timings as the signals at the input end of the neuron circuit 100, so that the neuron signals at the output end and the input end of the neuron circuit 100 are consistent in form, thus reducing nerve signal types in the circuit. In this embodiment, the trigger element D1 may be a falling edge triggered or level triggered D flip-flop, and it may be prepared under the smallest process node of a CMOS transistor, which is beneficial to large-scale integration.

The feedback element T1 shown in FIG. 1 may be connected to the output end of the trigger element D1 and the input end of the memristive element M1, and may be used to control the voltage at the input end of the memristive element M1.

Specifically, the feedback element T1 may be a MOS transistor having a gate connected to the output end of the D flip-flop, a drain connected to the input end of the memristive element M1, and a source grounded to the substrate 11. The output signal of the D flip-flop is used as a driving signal, and a gate bias of the feedback element T1 is the output signal of the D flip-flop. In this way, when a signal is output at the output end of the trigger element D1, that is, when the output signal of the D flip-flop is at a high level, the source and drain of the feedback element T1 are turned on, so that the voltage at the input end of the memristive element M1 is pulled down to a zero potential to provide a recovery period for the memristive element M1 to spontaneously return to the high-resistance non-conducting state. During the recovery period, the neuron circuit 100 does not respond to any signal and prepares for the next signal response. The MOS transistor serving as the feedback element T1 may also be prepared under the smallest process node, which is beneficial to large-scale integration.

The AND circuit A1 shown in FIG. 1 may perform an AND operation on the output signal of the trigger element D1 and the clock control signal CLK. An output signal of the AND circuit A1 is used as the output signal of the neuron circuit 100. This improves the driving ability of the neuron.

In this embodiment, the neuron circuit 100 may further include a synaptic element S1 for adjusting the intensity of the excitation signal input to the memristive element M1. The synaptic element S1 may be a non-volatile memristor device, which has a high resistance state and a low resistance state.

Specifically, the intensity of the excitation signal input to the neuron circuit 100 is adjusted by changing the conductance value of the synaptic element S1. The greater the conductance value of the synaptic element S1, the greater the intensity of the signal received by the neuron circuit 100, and the smaller the pulse frequency at which the neuron circuit 100 after excitation generates an action potential output, and vice versa.

In this embodiment, the neuron circuit 100 may further include: a first bias element T2 with one end connected to the input end of the memristive element M1 and the other end grounded; and a second bias element T3 with one end connected to the output end of the memristive element M1 and the other end grounded.

Specifically, the first bias element T2 may be a CMOS transistor having a drain connected to the input end of the memristive element M1, a source grounded to the substrate 11, and a gate with a small constant voltage bias being applied thereto. The second bias element T2 may be a CMOS transistor having a drain connected to the output end of the memristive element M1, a source grounded to the substrate 11, and a gate with a small constant voltage bias being applied thereto.

In this way, a source/drain resistance of the first bias element T2 after being biased may be much greater than a channel resistance of the second bias element T3 in a bias state, and a channel resistance of the first bias element T2 after being biased is smaller than a resistance of the synaptic element S1 in the high resistance state and greater than the resistance of the synaptic element S1 in the low resistance state. It should be noted that the source/drain resistance of the first bias element T2 is more than 10 times the channel resistance of the second bias element T3 in the bias state. Furthermore, by applying a small bias to the gate of the second bias element T3, the source/rain resistance of the second bias element T3 may be slightly greater than a conducting resistance of the memristive element M1, and the channel resistance of the second bias element T3 may be much smaller than the resistance of the memristive element M1 in the high resistance state and greater than the resistance of the memristive element M1 in the low resistance state.

In a further preferred embodiment, the input excitation signal may be current excitation or voltage excitation. The output of the neuron circuit 100 is generated by an accumulation of the input excitation signal in time, and a periodic frequency of the output signal increases with an increase of the input excitation within a predetermined range.

Figure 7:
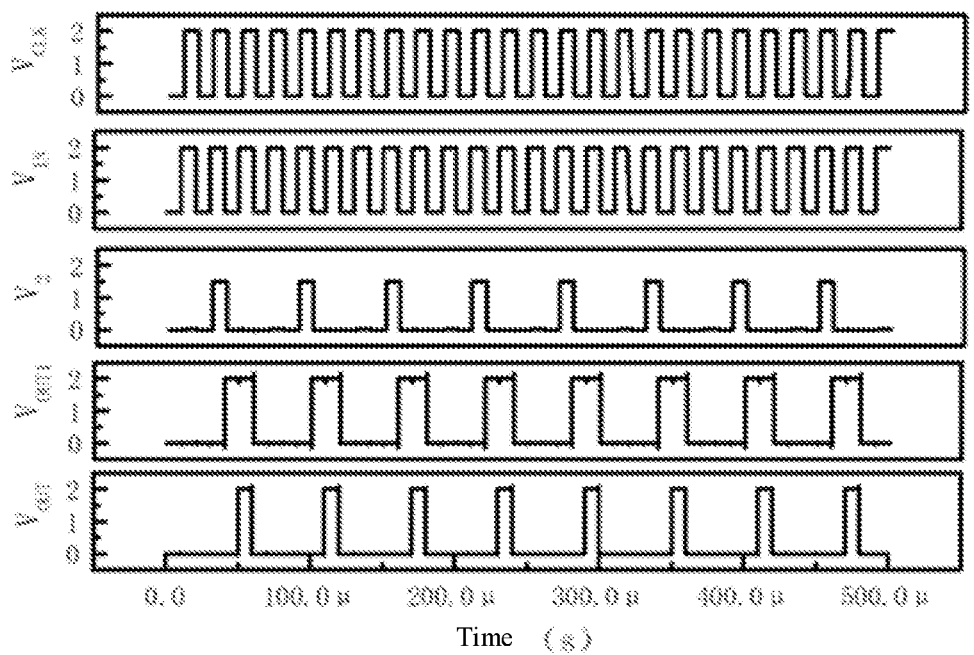
FIG. 7 is a schematic potential diagram of output signals of each node and a final output signal of the neuron circuit provided by the present disclosure under a continuous voltage pulse input.

FIG. 7 shows a potential diagram of each node in the process in which the neuron circuit 100 according to the embodiment of the present disclosure generates an action potential. An input pulse signal V has the same timings as the clock control signal CLK. When multiple input pulses are input to the neuron circuit 100, the memristive element M1 integrates. When the first voltage threshold of the memristive element M1 is reached (that is, a conductive path is formed in the memristive element M1, and the memristive element M1 is turned on), a potential on a node 2 suddenly increases. A signal $V_2$ of the node 2 is used as the input of the trigger element D1, so that a signal is output at the output end OUT1 of the trigger element D1. An output signal $V_{out1}$ of the OUT1 and the clock control signal $V_{clk}$, after an AND operation is performed, act as an output signal Vout of the neuron circuit 100.

Figure 8:
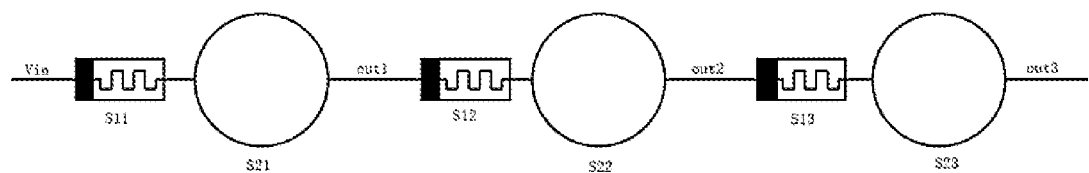
FIG. 8 is a schematic diagram of a neural network circuit provided by an embodiment of the present disclosure.

According to another aspect of the present disclosure, as shown in FIG. 8, an embodiment of the present disclosure provides a neural network circuit, including: a plurality of neuron circuits 100 described above, and a plurality of synaptic elements S1 for connecting adjacent two of the neuron circuits. The intensity of the input signal of the neuron circuit 100 may be adjusted by the conductance value of the synaptic element S1.

Figure 9:
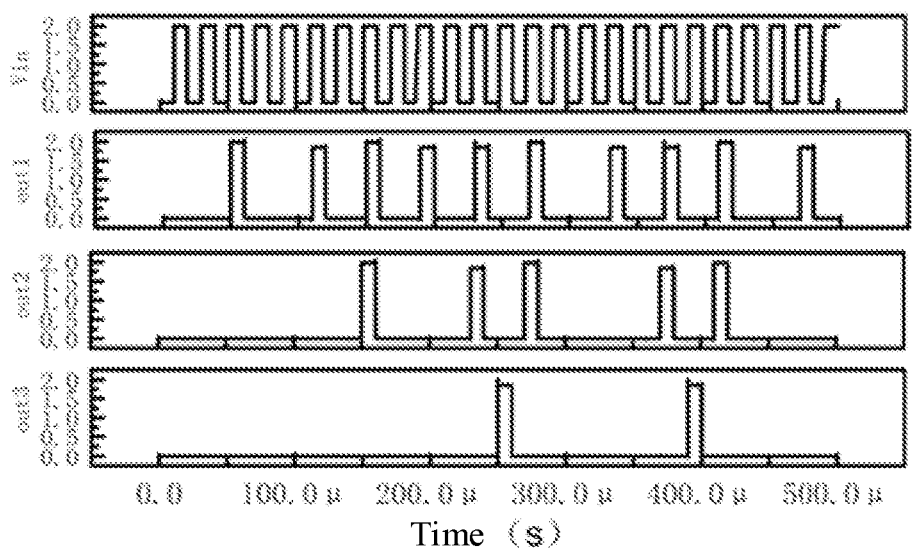
FIG. 9 is a sequence diagram of output action potentials of the neural network circuit in FIG. 8.

FIG. 9 shows a bitmap of cascaded output signals of three neuron circuits 100 shown in FIG. 8. The input signal is integrated on a first neuron so that the threshold-conversion memristive element M1 in neuron S21 is turned on and then generates an output signal out1. The output signal out1 acts as an input of a second neuron S22 so that the second neuron integrates and then generates an output signal out2, which acts as an input signal of a third neuron S23. After receiving the input signal of the second neuron, a third neuron integrates so that the threshold-conversion memristive element M1 in the neuron S23 is turned on to generate an output signal. In addition, the intensity of the input signal of the neuron circuit 100 may be adjusted by the conductance value of the synaptic element. That is to say, the intensity of the input signal V of the neuron S21 is adjusted by a synapse S11, the intensity of the input signal out1 of the neuron S22 is adjusted by a synapse S12, and the intensity of the input signal out2 of neuron S23 is adjusted by a synapse S13. Therefore, the neuron circuit 100 proposed in the embodiment of the present disclosure has a cascade function. Certainly, the neural network circuit is not limited to the connection of the three neuron circuits 100 shown in FIG. 8. The number of neuron circuits 100 may be increased or decreased according to the actual situation to meet actual needs.

Compared with the related art, the embodiments of the present disclosure may have the following advantages.

1. A new type of volatile threshold-conversion memristive device is used as an integral component of the neuron, which may have characteristics of integrated emission of biological neurons and is beneficial to production of a brain-like nerve chip.

2. A clock control of the output signal is achieved through a digital trigger, and a driving ability of the neuron is improved through the AND output.

3. The neuron circuit provided by the present disclosure has a simple structure, and its related devices may be prepared under the most advanced CMOS nodes, which is beneficial to high-density integration of circuits. Moreover, compared with the traditional CMOS circuit, reset operation is reduced by using volatility characteristics of the threshold-conversion device, and the energy consumption is greatly reduced.

Regarding the embodiments of the present disclosure, it should be noted that, in the case of no conflict, the embodiments of the present disclosure and the features in the embodiments may be combined with each other to obtain new embodiments.

Finally, it should be noted that the above embodiments are only used to illustrate and not to limit the technical solutions of the present disclosure. Although the present disclosure has been described in detail with reference to the preferred embodiments, those ordinary skilled in the art should understand that modifications or equivalent substitutions may be made to the technical solutions of the present disclosure without departing from the spirit and scope of the technical solutions of the present disclosure.

The invention claimed is:

1. A neuron circuit, comprising:
   a memristive element configured to receive an excitation signal;
   a trigger element connected to the memristive element and configured to receive a clock control signal for the neuron circuit and an output signal of the memristive element;
   a feedback element connected to an output end of the trigger element and an input end of the memristive element, and configured to control a voltage at the input end of the memristive element; and
   an AND circuit configured to perform an AND operation on an output signal of the trigger element and the clock control signal;
   wherein an output signal of the AND circuit acts as an output signal of the neuron circuit.

2. The neuron circuit according to claim 1, wherein an initial state of the memristive element is a high-resistance non-conducting state, and the memristive element is configured to enter a low-resistance conducting state when a voltage at the input end of the memristive element is greater than a first threshold voltage of the memristive element.

3. The neuron circuit according to claim 2, wherein the memristive element is configured to accumulate a voltage of the excitation signal at the input end of the memristive element so that the voltage at the input end of the memristive element is greater than the first threshold voltage of the memristive element.

4. The neuron circuit according to claim 3, wherein the memristive element is a volatile threshold-conversion memristive element.

5. The neuron circuit according to claim 2, wherein the memristive element is configured to spontaneously return to the high-resistance non-conducting state when the voltage at the input end of the memristive element is smaller than a second threshold voltage of the memristive element;
   wherein the first threshold voltage is greater than the second threshold voltage.

6. The neuron circuit according to claim 5, wherein when a signal is output at the output end of the trigger element, the feedback element is turned on, and the voltage at the input end of the memristive element is reduced, so that the memristive element spontaneously returns to the high-resistance non-conducting state.

7. The neuron circuit according to claim 6, wherein the memristive element is a volatile threshold-conversion memristive element.

8. The neuron circuit according to claim 5, wherein the memristive element is a volatile threshold-conversion memristive element.

9. The neuron circuit according to claim 2, wherein the memristive element is a volatile threshold-conversion memristive element.

10. The neuron circuit according to claim 9, wherein the volatile threshold-conversion memristive element comprises:
a substrate;
a first electrode layer located on the substrate;
a functional layer located on the first electrode layer; and
a second electrode layer located on the functional layer;
wherein the functional layer is configured to isolate the first electrode layer from the second electrode layer so that the initial state of the memristive element is the high-resistance non-conducting state, and to provide a growth medium for the memristive element to change from the high-resistance non-conducting state to the low-resistance conducting state.

11. The neuron circuit according to claim 10, wherein,
the substrate is made of silicon wafer, quartz or organic flexible film;
the first electrode layer is made of inert conductive metal material;
the functional layer is made of insulator or semiconductor material; and
the second electrode layer is made of conductive metal material.

12. The neuron circuit according to claim 11, wherein,
the first electrode layer is made of at least one of Pd, Au, Ru, Pt, TiN, TaN, ITO, W, or Ta;
the functional layer is made of at least one of $SiO_2$, $HfO_2$, $SiN_x$, $TaO_x$, $MgO_x$, a-Si, $NbO_x$, $VO_x$, or $AM_4Q_8$, wherein A is Ga or Ge, M is V, Nb, Ta or Mo, and Q is S or Se; and
the second electrode layer is made of at least one of Ag, Cu, Pd, Au, Ru, Pt, TiN, TaN, ITO, W, or Ta.

13. The neuron circuit according to claim 9, further comprising a synaptic element configured to adjust an intensity of the excitation signal.

14. The neuron circuit according to claim 13, further comprising:
a first bias element having one end connected to the input end of the memristive element and the other end grounded; and
a second bias element having one end connected to the output end of the memristive element and the other end grounded.

15. The neuron circuit according to claim 13, wherein the synaptic element is a non-volatile memristive device.

16. A neural network circuit, comprising:
a plurality of neuron circuits according to claim 1; and
a plurality of synaptic elements configured to connect adjacent two of the neuron circuits.

17. The neural network circuit according to claim 16, wherein an intensity of an input signal of the neuron circuit is adjusted by a conductance value of the synaptic element.

18. The neural network circuit according to claim 16, wherein an initial state of the memristive element is a high-resistance non-conducting state, and the memristive element is configured to enter a low-resistance conducting state when a voltage at the input end of the memristive element is greater than a first threshold voltage of the memristive element.

19. The neural network circuit according to claim 18, wherein the memristive element is configured to accumulate a voltage of the excitation signal at the input end of the memristive element so that the voltage at the input end of the memristive element is greater than the first threshold voltage of the memristive element.

20. The neural network circuit according to claim 18, wherein the memristive element is configured to spontaneously return to the high-resistance non-conducting state when the voltage at the input end of the memristive element is smaller than a second threshold voltage of the memristive element;
wherein the first threshold voltage is greater than the second threshold voltage.

* * * * *